United States Patent [19]

Hain et al.

[11] Patent Number: 4,830,312
[45] Date of Patent: May 16, 1989

[54] AIRPLANE, PREFERABLY A HELICOPTER

[75] Inventors: Klaus Hain, Leonberg; August Hofbauer, Pforzheim; Manfred Hochkönig, Moglingen, all of Fed. Rep. of Germany

[73] Assignee: Dr. Ing. h.c.F. Porshce Aktiengesellschaft, Weissach, Fed. Rep. of Germany

[21] Appl. No.: 169,874

[22] Filed: Mar. 18, 1988

[30] Foreign Application Priority Data

Mar. 26, 1987 [DE] Fed. Rep. of Germany ....... 3709924

[51] Int. Cl.4 ............................................ B64D 33/08
[52] U.S. Cl. .................................. 244/17.11; 244/57
[58] Field of Search ............................. 244/17.11, 57

[56] References Cited

U.S. PATENT DOCUMENTS

| 1,427,872 | 9/1922 | Verville | 244/57 |
| 2,274,442 | 2/1942 | Woods | 244/57 |
| 2,434,085 | 1/1948 | Suggs | 244/57 |
| 2,551,455 | 5/1951 | Neale | 244/57 |
| 4,301,981 | 11/1981 | Hartt | 244/12.2 |
| 4,483,147 | 11/1984 | Evans et al. | 244/57 |

FOREIGN PATENT DOCUMENTS

| 142527 | 6/1948 | Australia | 244/17.11 |
| 453934 | 1/1949 | Canada | 244/17.11 |
| 472306 | 9/1937 | United Kingdom | 244/17.11 |
| 585317 | 2/1947 | United Kingdom . | |
| 723452 | 2/1955 | United Kingdom . | |

OTHER PUBLICATIONS

*American Helicopter*, Dec. 1952, "Matra-Cantinieau MC-101", by M. Berry.
*Flight International*, Mar. 31, 1966, "The Wallis Autogyros", pp. 515–520.

Primary Examiner—Joseph F. Peters, Jr.
Assistant Examiner—Rodney Corl
Attorney, Agent, or Firm—Barnes & Thornburg

[57] ABSTRACT

A helicopter is driven by means of a rotor that is connected with an internal-combustion engine. The air-cooled internal-combustion engine has a horizontally opposed construction and is arranged within walls of a cabin of the helicopter. In order to supply the internal-combustion engine with cooling air and intake air, air inlet openings are provided at the side walls of the cabin. For the discharge of the cooling air, outlet openings are arranged at the underside of the cabin.

19 Claims, 2 Drawing Sheets 4,830,312

AIRPLANE, PREFERABLY A HELICOPTER

BACKGROUND AND SUMMARY OF THE INVENTION

The invention relates to an airplane, preferably a helicopter, of the type driven by a piston type internal combustion engine arranged within the walls of a cabin In British Pat. (GB-PS) No. 723,452, a vertically standing, horizontally opposed internal-combustion "boxer type" engine is shown that drives a rotor of a flying apparatus.

British Pat. (GB-PS) No. 585,317 shows an internal-combustion engine of an airplane, also of horizontally opposed piston construction, the cylinders of which are arranged in a horizontal position.

It is an object of the invention to provide such arrangements and take such measures at a helicopter that is driven by an internal-combustion engine that, while a good intake air supply is ensured, the internal-combustion engine and its assemblies are reliably supplied with cooling air also under extreme operating conditions.

According to the invention, this objective is achieved by installing the engine horizontally in the helicopter cabin and by providing cooling air inlet opening means at a side wall of the cabin.

The main advantages achieved by means of the invention are that the cooling blower and the suction system of the internal-combustion engine are supplied with the respective medium—cooling air, intake air—in a simple and advantageous way, in which case the existing pressure difference between the side wall and the underside of the cabin is utilized effectively for the disposal of the used-up cooling air. The air inlet opening at the longitudinal sides of the cabin, via which a sufficient amount of air enters, can be integrated into the side walls of the helicopter without any problems. The guiding ducts, the pipe system and the outlet duct are easily manufacturable parts and may be installed in the cabin without difficulty.

Cooling air flows through the coolers—the oil cooler and/or the charge air cooler in an operationally adequate manner in preferred embodiments of the invention. An auxiliary blower is provided in certain preferred embodiments that is driven by the internal-combustion engine to ensure that in an extreme flying situation, for example, during hovering, the coolers are sufficiently acted upon by cooling air.

Other objects, advantages and novel features of the present invention will become apparent from the following detailed description of the invention when considered in conjunction with the accompanying drawings.

BRIEF DESCRIPTION OF THE DRAWINGS

FIG. 3 is an enlarged detail X of FIG. 2.

DETAILED DESCRIPTION OF THE DRAWINGS

Figure 1:
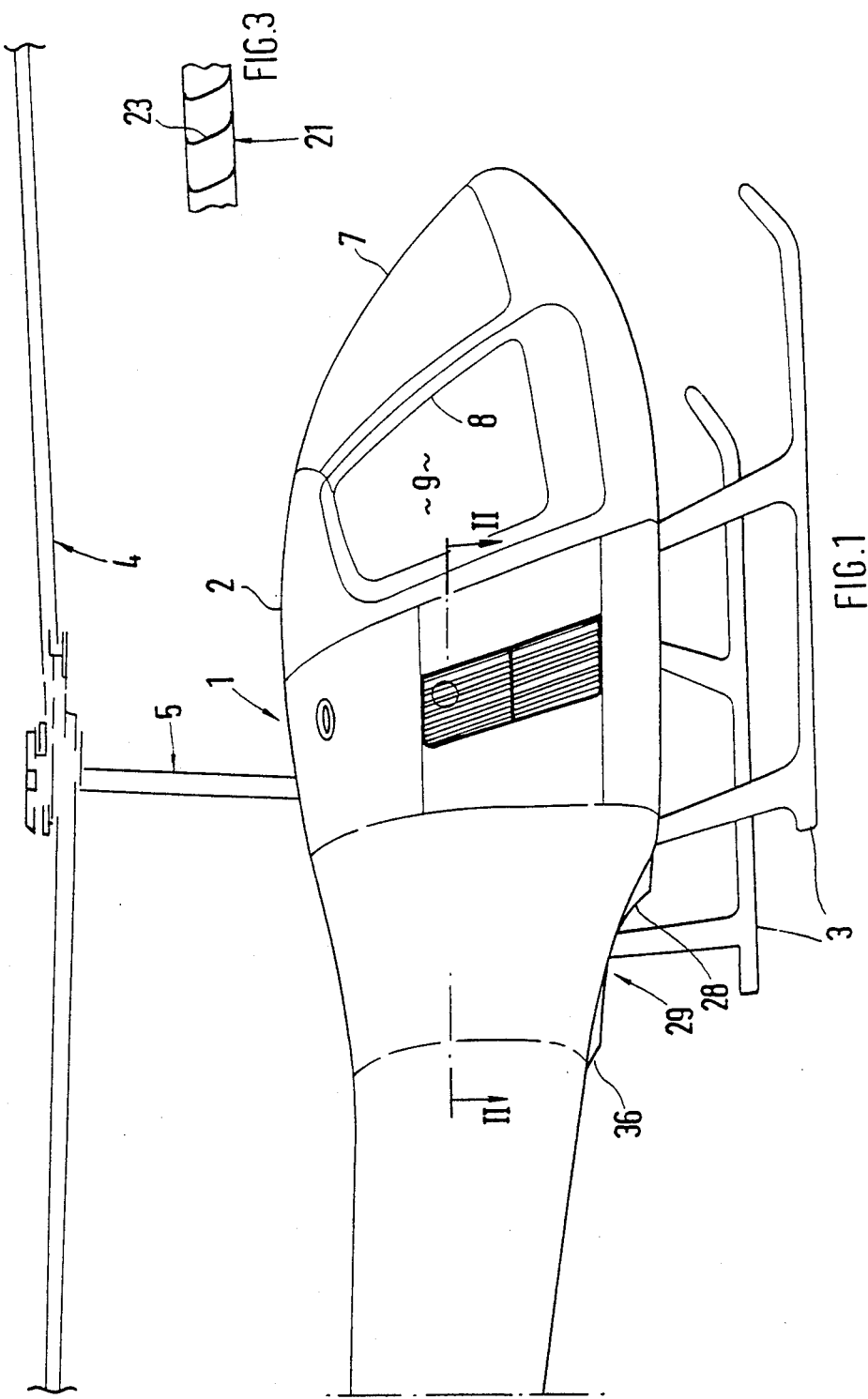
FIG. 1 is a partial lateral schematic view of a helicopter constructed according to a preferred embodiment of the invention.
Figure 2:
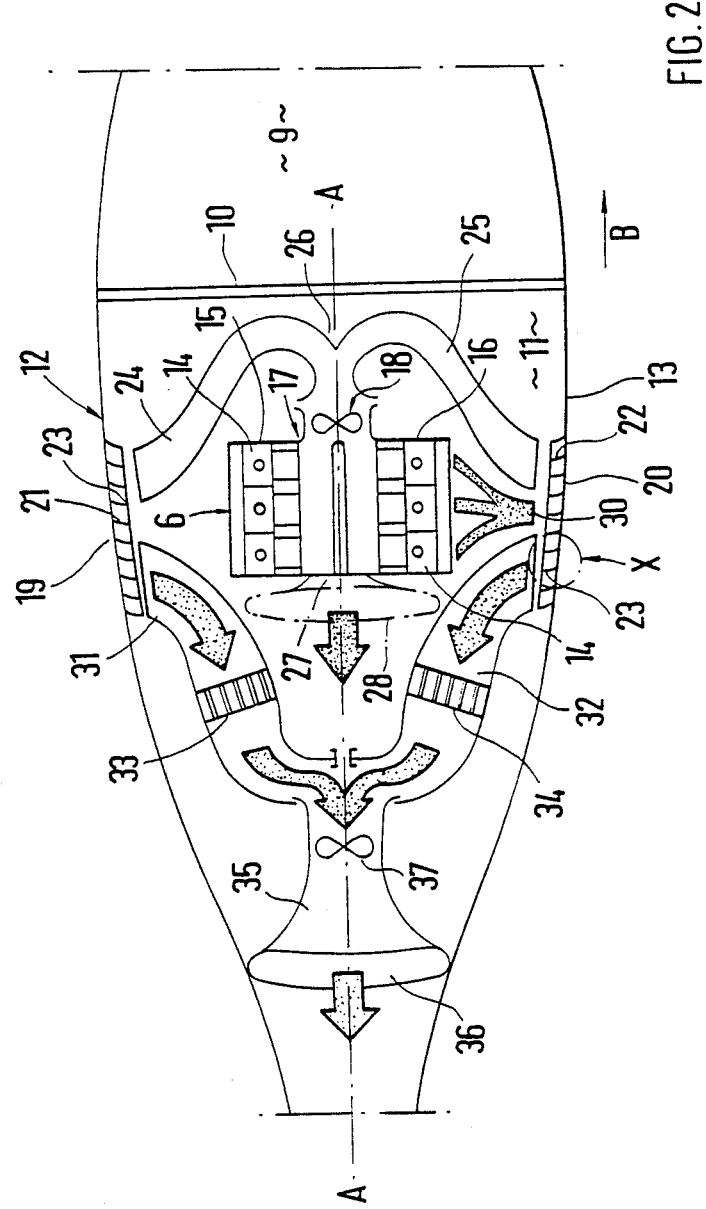
FIG. 2 is a sectional schematic view taken along Line II—II of FIG. 1.

A helicopter 1 comprises a cabin 2 that is carried by skids 3. A rotor 4 is connected with an internal-combustion engine 6 via a shaft 5 and by means of a coupling system that is not shown.

The cabin 2 has a windshield 7 and side doors 8 that delimit a passenger compartment 9. The passenger compartment 9 is separated, by means of a partition 10, from an assembly area 11. In addition, the cabin 2 has side walls 12, 13 that have the largest distance from one another approximately in the area of the partition 10.

The piston-type internal-combustion engine 6 is air-cooled, its six cylinders 14 being arranged in two rows 15, 16, namely in a joint plane, in such a way that the internal-combustion engine is of a horizontally opposed construction.

In the embodiment shown, the internal-combustion engine 6 is arranged horizontally in a central longitudinal plane A—A of the helicopter 1; i.e., the rows 15, 16 of cylinders extend approximately in a horizontal plane. In addition, at its forward side 17, the internal-combustion engine 6—viewed in flying direction B—is equipped with a cooling blower 18 that is driven by its crankshaft by means of a transmission (not shown).

In order to supply the internal-combustion engine with cooling air and intake air, inlet openings 19, 20 are provided at the side walls 12, 13 and are equipped with grids 21, 22. The grids 21, 22 are provided with plates 23, the shape of which largely prevents the entering of dirt particles into the air inlet openings (FIG. 3).

Guiding ducts 24, 25, that are guided together at reference point 26, extend between the air inlet openings 19, 20 and the cooling-air blower 18. The heated cooling medium leaving the internal-combustion engine 6, approximately at reference point 27, emerges from the internal-combustion engine 6 and leaves the cabin 2 through an outlet opening 28 at the underside 29 of the mentioned cabin 2. Thus, an existing pressure difference between the side walls 12, 13 and the underside 29 is utilized for the supply and the removal of cooling air.

The intake air is guided, via a pipe system 30, to an intake manifold of the internal-combustion engine 6 that is not shown in detail. However, embodiments are also contemplated where the internal-combustion engine 6 is supplied with this medium by the ambient air in the assembly space 11 that, via the air inlet openings 19, 20, is connected with the exterior side of the cabin 2.

In addition, at the interior side of the cabin 2, guiding ducts 31, 32 lead away from the air inlet openings 19, 20 and extend in the direction of the tail of the helicopter 1. The coolers 33, 34 are inserted into the guiding ducts 31, 32, the cooler 33 being a charge air cooler, and the cooler 34 being an oil cooler. The guiding ducts 31, 32, in a fork-type way, are connected to an outlet duct 35 extending in the central longitudinal plane B—B, the outlet opening 36 of this outlet duct 35 also being mounted at the underside 29 of the cabin 2. The outlet opening 36 and the outlet opening 28 are mounted at different locations of the cabin.

Finally, an auxiliary blower 37 is arranged in the outlet duct 35 and is connected on the outlet side of the coolers 34, 35. The auxiliary blower 37 is driven by the crankshaft of the internal combustion engine 6.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. An airplane, preferably a helicopter, that is driven by a piston-type internal-combustion engine by means of a rotor, the internal-combustion engine being arranged within longitudinal side walls of a cabin, wherein the internal-combustion engine is air-cooled and constructed according to the horizontally opposed "boxer" type construction, is installed horizontally into the cabin and is supplied with cooling air and intake air via guiding ducts connected to at least one air inlet opening mounted at each longitudinal side wall of the cabin, and wherein additional guiding ducts leading away from the at least one air inlet opening are connected in a fork-type manner to an outlet duct having an outlet opening at the underside of the cabin, coolers of the internal-combustion engine inserted into the additional guiding ducts and an auxiliary blower being provided in the outlet duct with the auxiliary blower preferably on the outlet side of the coolers.

2. An airplane according to claim 1, wherein guiding ducts are provided for the cooling air between the air inlet openings and a cooling-air blower of the internal-combustion engine.

3. An airplane according to claim 2, wherein the cooling air blower is provided at the forward side of the internal-combustion engine, and wherein heated cooling air leaving the internal-combustion engine is discharged through an outlet opening at the underside of the cabin.

4. An airplane according to claim 1, wherein the intake air is guided in a pipe system between the air inlet openings and an intake manifold of the internal-combustion engine.

5. An airplane according to claim 4, wherein the air inlet openings are equipped with grids.

6. An airplane according claim 1, wherein the auxiliary blower is driven by the internal-combustion engine, preferably by its crankshaft.

7. An airplane according to claim 1, wherein the air inlet openings are equipped with grids.

8. An airplane according to claim 7, wherein the grids have several plates that extend upright at the cabin and have such a shape that the entering of dirt particles into the air inlet openings is largely prevented.

9. An airplane according to claim 8, wherein guiding ducts are provided for the cooling air between the air inlet openings and a cooling-air blower of the internal-combustion engine.

10. An airplane according to claim 1, wherein the at least one air inlet opening are equipped with grids.

11. An airplane, preferably a helicopter, that is driven by a piston-type internal-combustion engine by a rotor, the preferably air-cooled internal-combustion engine constructed according to the horizontally opposed boxer-type construction being installed horizontally in a cabin having longitudinal side walls and being supplied with cooling air and intake air via at least one air inlet opening mounted at a side wall of the cabin, wherein:
(a) guiding ducts for the cooling air are provided between the at least one air inlet opening and a cooling air blower of the internal-combustion engine;
(b) the cooling air blower is provided at the front side of the internal-combustion engine, the heated cooling air leaving the internal-combustion engine being discharged through an outlet opening at the underside of the cabin; and
(c) additional guiding ducts lead away from the at least one air inlet opening, with coolers of the internal-combustion engine being inserted into the additional guiding ducts.

12. An airplane according to claim 11, wherein air inlet openings are provided at both longitudinal sides of the cabin.

13. An airplane according to claim 11, wherein the intake air is guided in a pipe system between the at least one air inlet opening and an intake manifold of the internal-combustion engine.

14. An airplane according to claim 13, wherein the at least one air inlet opening equipped with grids.

15. An airplane according to claim 11, wherein the additional guiding ducts are connected in a fork-type manner to an outlet duct.

16. An airplane according to claim 11, wherein an auxiliary blower is provided in an outlet duct, and wherein said auxiliary blower is connected preferably on the outlet side of the coolers.

17. An airplane according to claim 16, wherein the auxiliary blower is driven by the internal-combustion engine, preferably by its crankshaft.

18. An airplane according to claim 11, wherein the at least one inlet opening equipped with grids.

19. An airplane according to claim 18, wherein the grids have several plates that extend upright at the cabin and have such a shape that the entering of dirt particles into the at least one air inlet opening is largely prevented.

* * * * *